May 29, 1956     A. F. STONE ET AL     2,747,621
CHAIN-SAW HOLDING CLAW
Filed Oct. 9, 1951     2 Sheets-Sheet 1
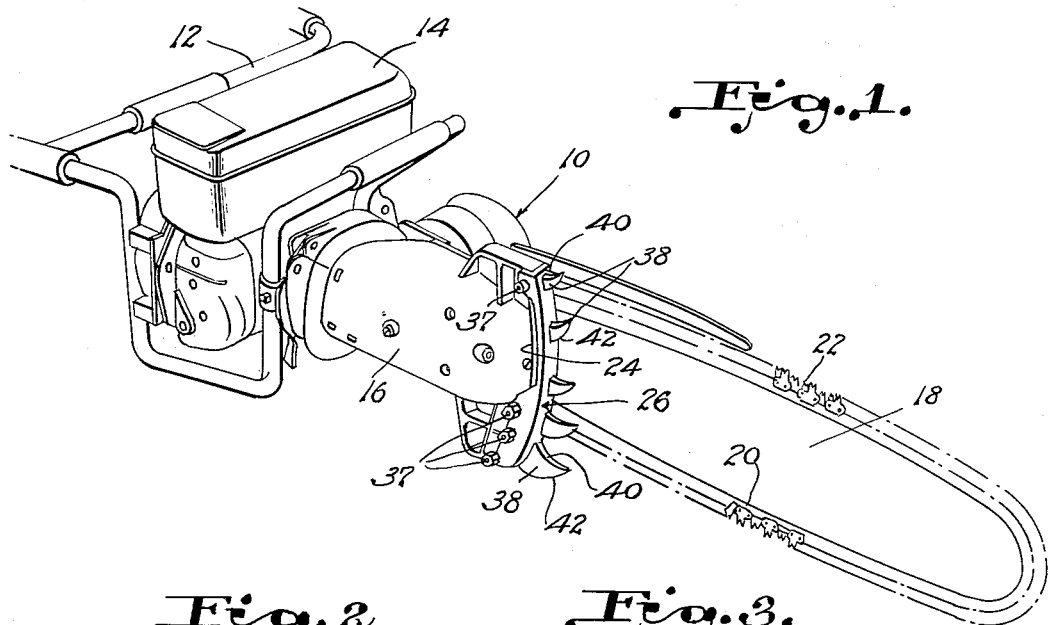
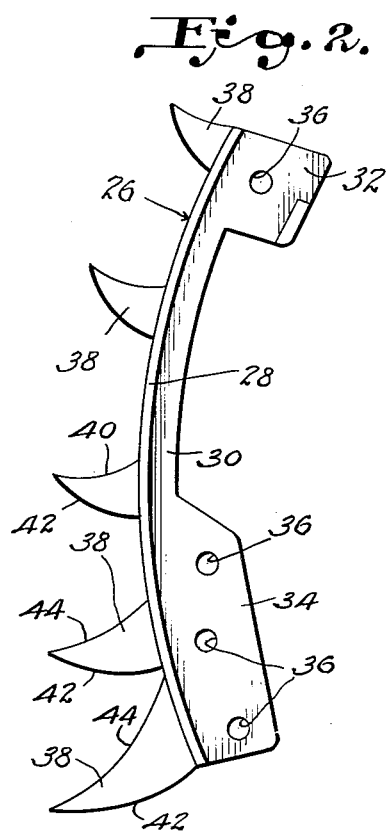
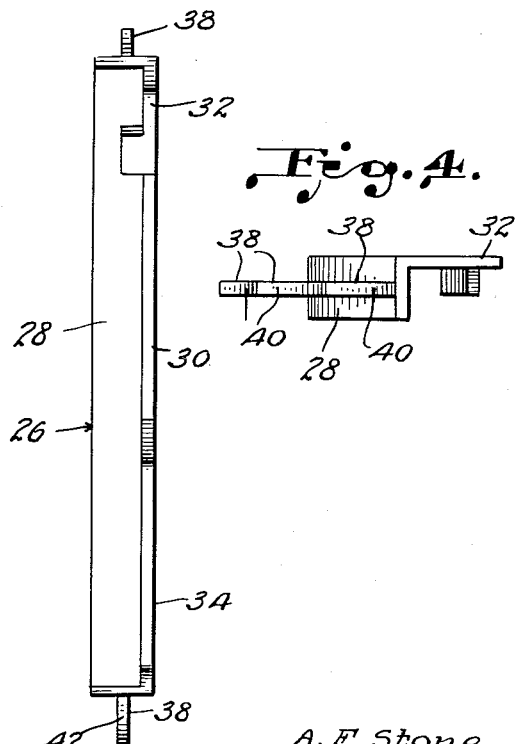
A. F. Stone
E. A. Hayden
INVENTORS.
BY *CA Snow & co.*
ATTORNEYS

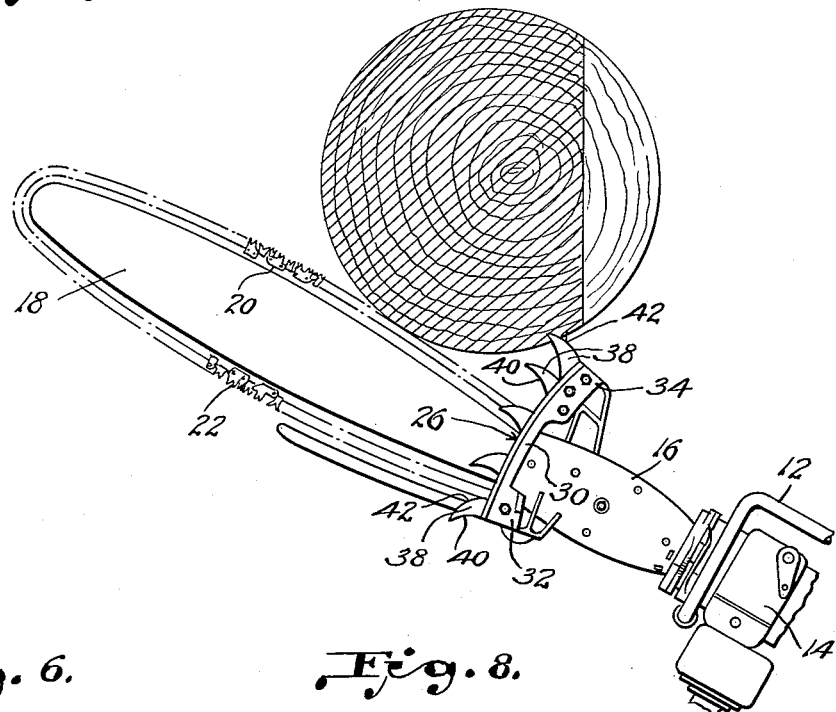
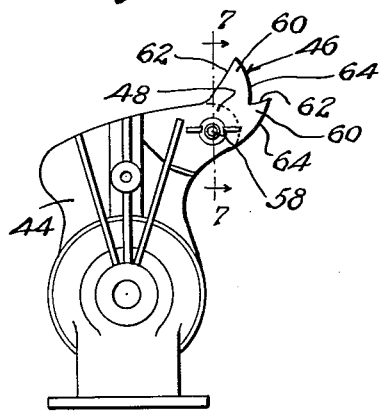
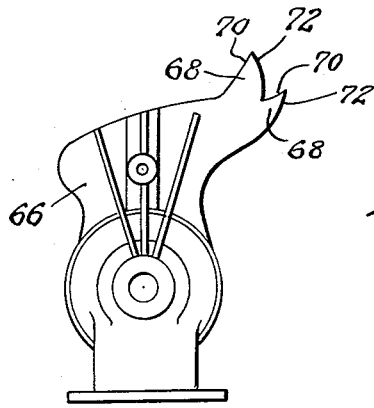
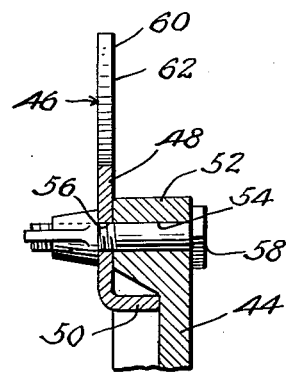
A. F. Stone
E. A. Hayden
INVENTORS.

United States Patent Office 2,747,621
Patented May 29, 1956

2,747,621

CHAIN-SAW HOLDING CLAW

Albert F. Stone and Ernest A. Hayden, Callahan, Calif.

Application October 9, 1951, Serial No. 250,538

5 Claims. (Cl. 143—32)

This invention relates to a chain-saw holding claw and has for its primary object to support and steady a portable power driven chain-saw on a piece of work.

In the conduct of lumbering operations portable power driven chain-saws of the type having an endless series of saw teeth moving in a closed path are widely employed. Saws of this type are generally powered by a portable internal combustion engine and carry adjacent one end of the closed path in which the saw teeth operate a stop commonly referred to as a bumper shoe which is adapted to engage the work and be held thereagainst by the drag of the saw teeth through the work. While such bumper shoes admirably serve as stops, they fail in any way to support and sustain the saw in position on the work so that the workmen engaged in timbering operations and the like are subjected to severe strain particularly when placing a saw in operative position against the work and prior to the production of a cut in the work of sufficient depth to support the saw against movement laterally with relation to the closed path in which the teeth operate.

The primary object of this invention is to support and sustain the saw against lateral movement relative to the path in which the saw teeth move and to thereby relieve the operator of considerable strain and effort.

Another object is to enable the ordinary bumper shoe to be employed as the sustaining and supporting device which will maintain the saw in proper position with relation to the work both prior to and during the cutting of the work.

Still another object is to enable a single chain-saw operator to feed the saw through the work at full efficiency, and to synchronize the feed with the available power.

A further object is to dispense with the services of an attendant at the end of the saw remote from the prime mover whose duty in the past has been to cooperate with the operator in feeding the saw through the work.

A still further object of the invention is to convert the ordinary bumper shoe into a sustaining and supporting device for the saw and at the same time to facilitate the rapid demounting of the saw from the work when the cut through the work has been completed.

The above and other objects may be attained by employing this invention which embodies among its features a series of spaced pointed prongs carried by the bumper shoe of a conventional portable power driven chain-saw and projecting therefrom toward the end of the closed path in which the saw teeth move remote from the bumper shoe, said prongs being movable with the saw for successive penetration of the work to thereby steady and support the saw on the work immediately prior to and during the cutting thereof.

Other features include diminishing the length of the prongs as they recede from the side of the closed path along which the saw teeth run during the cutting of the work, the curving of the prongs so that opposite side edges of the prongs are respectively concave and convex, with the concave sides forming the leading edges of the prongs during the advance of the saw through the work to thereby facilitate the successive extraction of the prongs from the work as the saw advances.

Still other features of the invention involve the construction of a holding claw that may be readily attached to or detached from the conventional bumper shoe of a power driven chain-saw.

This application is a substitute and continuation in part of each of our co-pending applications Serial No. 755,778 filed June 19, 1947, and Serial No. 193,372 filed November 1, 1950, both now abandoned.

In the drawings,

Fig. 1 is a perspective view of a conventional chain-saw illustrating our improved holding claw mounted on the bumper shoe thereof, Fig. 2 is a side view of this improved holding claw, Fig. 3 is an edge view of the holding claw illustrated in Fig. 2, Fig. 4 is a plan view of the holding claw illustrated in Fig. 2, Fig. 5 is a plan view of a conventional chain-saw equipped with our improved holding claw showing the manner in which one of the prongs of the holding claw engages a piece of work prior to the swinging movement of the saw into cutting relation to the work, Fig. 6 is a view of a modified form of the invention showing it in position on another type of bumper shoe, Fig. 7 is an enlarged fragmentary sectional view taken substantially along the line 7—7 of Fig. 6, and Fig. 8 is a view similar to Fig. 6 of a bumper shoe in which the prongs embodying the features of this invention are formed integrally therewith.

Referring to the drawings in detail a conventional portable power driven chain-saw designated generally 10 is supported on a frame 12 and includes a prime mover 14 which in the present instance is shown as being of the internal combustion engine type. The prime mover is connected to drive mechanism contained within a housing 16 from which projects a conventional elongated saw blade 18 around the edges of which runs in a closed path an endless chain 20 carrying saw teeth 22. In the ordinary construction of such devices, the housing 16 is designed to rotate about the longitudinal axis of the drive shaft of the prime mover 14 so that the saw may be employed to cut standing timber, or by rotating it about the axis of the drive shaft of the prime mover to cut through logs which may be lying on the ground. Carried by the housing 16 adjacent the saw blade 18 and projecting toward the end of the closed path remote from the housing 16 is a conventional bumper shoe 24 which under ordinary circumstances is engaged against the work to form a fulcrum about which the saw swings while cutting through the work. The structure so far described is conventional with chain-saws now commonly employed in timbering operations and forms no part of this invention.

Our invention comprises a holding claw designated generally 26 which comprises a plate 28 which is curved to conform to the curvature of the bumper shoe 24 and carries on its concave side and adjacent one side edge a reinforcing flange 30 which terminates adjacent opposite ends in attaching flanges 32 and 34 having bolt receiving openings 36 extending therethrough for the reception of suitable attaching bolts 37 by means of which the device is mounted on the bumper shoe 24.

Carried by and projecting outwardly from the convex face of the plate 28 are pointed prongs 38 which are spaced from one another and when in position on the bumper shoe project toward the end of the closed path in which the saw teeth 22 operate remote from the bumper shoe. The pointed prongs 38 diminish in length as they recede from the edge of the saw blade 18 which advances into the work, and each prong is curved throughout its length along intersecting arcs to provide a concave leading edge 40 and a convex trailing edge 42.

In the modified form of the invention illustrated in Figs. 6 and 7 a bumper shoe 44 of a type somewhat different from the bumper shoe 24 has attached thereto a holding claw designated generally 46 and embodying the features of this invention. This holding claw comprises a plate 48 carrying adjacent one end an angular arm 50 for engagement with the bumper shoe 44 which carries a boss 52 having an opening 54 extending therethrough which aligns with an opening 56 in the plate 48 for the reception of a clamping bolt 58 by means of which the plate 48 is held on the bumper shoe 44. The edge of the plate 48 remote from the arm 50 is provided with spaced pointed prongs 60 which curve throughout their lengths, and are provided with concave leading edges 62 and convex trailing edges 64.

In the further modified form of the invention illustrated in Fig. 8, a bumper shoe 66 has formed integrally therewith spaced pointed prongs 68 which project from said shoe toward the end of a saw blade remote from the bumper shoe and curve throughout their length. Like the prongs previously described, the leading edges 70 of the prongs 68 are concave, while their trailing edges 72 are convex so that as the saw swings during the cutting operation, the prongs 68 may be readily extracted from their penetrating relation with the work.

In use with a portable power driven chain-saw of the type illustrated in Fig. 1 equipped with this improved holding claw, the holding claw is positioned adjacent the work with the larger prong 38 against the work so that as soon as the saw teeth 22 are set into operation and brought into contact with the work, the larger prong will penetrate the work and steady the saw and hold it against lateral movement relative to the closed path in which the saw teeth move. As the saw is moved to advance the teeth into the cut, the entire unit will pivot about the point of the longer prong until the next adjacent prong is moved into contact with the work and penetrates it. Upon penetration of the second prong into the work, the saw will rock about the point thereof so as to extract the point of the first tooth from the work. Continued swinging movement of the saw through the work will bring successive prongs 38 into engagement with the work and cause them to penetrate it so that the saw will be steadied and held against lateral movement throughout the entire progress of the cut. Owing to the curvature of the prongs 38, it will be evident that a prong which has penetrated the work may be readily extracted from the work as the sawing operation progresses since the trailing edges 42 of the prongs are moving relative to the wall of the penetration in a direction substantially concentric with said wall. The operation of the modified forms of the invention as illustrated in Figs. 6 through 8 inclusive is essentially the same as that just described in that the prongs are brought into successive penetrating relation to the work and owing to their curvature their extraction from the work may be easily achieved.

While in the foregoing there has been shown and described the preferred embodiment of this invention it is to be understood that minor changes in the details of construction, combination, and arrangement of parts may be resorted to without departing from the spirit and scope of the invention as claimed.

What is claimed is:

1. A holding claw attachment for a portable power driven chain-saw comprising a curved plate adapted to be attached to the bumper shoe of a saw, a row of spaced pointed prongs projecting from the convex side of said plate and the points of said prongs lying along a curved path which lies eccentric to the curvature of the plate.

2. The structure recited in claim 1 in which the prongs are curved throughout their lengths.

3. In a portable power driven chain-saw of the type having an endless series of saw teeth mounted to move in an elongated closed path, and a bumper shoe carried by the saw adjacent one end of the closed path and extending laterally from said closed path to form a fulcrum for engaging a piece of work about which the saw swings while cutting through the work, means for holding the saw against lateral movement on the work during the swinging movement of the saw comprising a series of spaced pointed prongs carried by the bumper shoe and projecting therefrom toward the end of the closed path remote from the bumper shoe for movement with the saw and successive penetration of the work, and said prongs diminishing in length as they recede from the side of the closed path along which the saw teeth run during the cutting of the work.

4. The structure recited in claim 3 in which the prongs are of arcuate formation.

5. The structure recited in claim 4 in which the leading edges of the prongs are concave and their trailing edges are convex to facilitate the successive extraction of the prongs from the work as the saw advances through the work.

References Cited in the file of this patent

UNITED STATES PATENTS

| | | |
|---|---|---|
| 1,583,613 | Smith | May 4, 1926 |
| 1,601,201 | Daw | Sept. 28, 1926 |
| 1,723,125 | Bens | Aug. 6, 1929 |
| 2,446,774 | Mall | Aug. 10, 1948 |
| 2,572,405 | Stone et al. | Oct. 23, 1951 |

OTHER REFERENCES

Montgomery Ward Catalog, Fall and Winter, 1949–1950, page 1106, illustration C, model 12. Mall one-man chain saw.